US012719702B2

(12) United States Patent
Hardes

(10) Patent No.: US 12,719,702 B2
(45) Date of Patent: Aug. 25, 2026

(54) METHOD AND TERMINAL DEVICE FOR CRYPTOGRAPHICALLY SECURED TRANSMISSION OF DATA WITHIN A COMMUNICATION SYSTEM

(71) Applicant: Siemens Aktiengesellschaft, Munich (DE)

(72) Inventor: Hubert Hardes, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 19/152,079

(22) PCT Filed: Jan. 12, 2024

(86) PCT No.: PCT/EP2024/050687
§ 371 (c)(1),
(2) Date: Jul. 30, 2025

(87) PCT Pub. No.: WO2024/160513
PCT Pub. Date: Aug. 8, 2024

(65) Prior Publication Data

US 2026/0121868 A1 Apr. 30, 2026

(30) Foreign Application Priority Data

Jan. 31, 2023 (EP) .................................... 23154280

(51) Int. Cl.
*H04L 9/32* (2006.01)
*H04L 9/40* (2022.01)

(52) U.S. Cl.
CPC .......... *H04L 9/3263* (2013.01); *H04L 63/166* (2013.01)

(58) Field of Classification Search
CPC ........................... H04L 9/3263; H04L 63/166
See application file for complete search history.

(56) References Cited

U.S. PATENT DOCUMENTS 10,277,406 B1 * 4/2019 Veladanda ............ H04L 9/0825
10,404,477 B1 * 9/2019 Deck ..................... H04L 9/3247
(Continued)

FOREIGN PATENT DOCUMENTS

CN 108055236 5/2018
CN 109639427 4/2019
(Continued)

OTHER PUBLICATIONS

Gutmann University of Auckland P: "Simple Certificate Enrolment Protocol; rfc8894.txt", Simple Certificate Enrolment Protocol; RFC8894.TXT, Internet Engineering Task Force, IETF; Standard, Internet Society (ISOC) 4, Rue Des Falaises CH—1205 Geneva, Switzerland, Sep. 10, 2020 (Sep. 10, 2020), Seiten 1-26, XP015142102.
(Continued)

*Primary Examiner* — Henry Tsang
(74) *Attorney, Agent, or Firm* — Cozen O'Connor

(57) ABSTRACT

Method for cryptographically secured data transmission within a communication system, wherein terminal devices include a local certification instance which, when a terminal device is commissioned, generate a first key pair for the device and a request to create a certificate assigned to the key pair, and during protected operation of the terminal device, the request is transmitted to a higher-level certification instance that checks requests of local certification instances of each terminal device and, if the check is successful, creates a certificate assigned to the respective first key pair and transmitted to the respective local certification instance, after receiving the certificate generated by the higher-level certification instance, the terminal devices end protected operation, and after ending protected operation, the local certification instances generate a second key pair and a certificate for the second key pair for the cryp- (Continued)

tographically secured data exchange, where this certificate is signed using a private key.

14 Claims, 3 Drawing Sheets

(56) References Cited

U.S. PATENT DOCUMENTS 11,882,043 B2 1/2024 Albrecht et al.
2004/0093494 A1* 5/2004 Nishimoto ......... H04N 21/2347 348/E7.064
2018/0323977 A1* 11/2018 Hojsik .................... H04L 67/12
2018/0351941 A1 12/2018 Chhabra
2020/0220846 A1 7/2020 Schwering
2021/0067349 A1* 3/2021 Kruegel ................ H04L 9/3268
2022/0239641 A1 7/2022 Eckl et al.
2022/0353058 A1 11/2022 Kumaresan et al.
2025/0017545 A1 1/2025 Vu

FOREIGN PATENT DOCUMENTS

CN 109639427 A * 4/2019 ........... H04L 9/3263
CN 110546917 12/2019
EP 3700160 8/2020
EP 3646559 B1 6/2021
EP 3975502 3/2022
EP 4283925 11/2023
KR 20010048947 6/2001
WO 2020221528 11/2020

OTHER PUBLICATIONS

PCT International Search Report dated Apr. 2, 2024 based on PCT/EP2024/050687 filed Jan. 12, 2204.

* cited by examiner

CA
100
104
125
115
124
114
CSR
103
125
CD
126
CSR
124
121
L-CA
123
102
122
110
116
CD
101
111
113
PLC
L-CA
CSR
114
112

CA
100
104
201
201
202
202
203
R-CRT
204
200
DEV1
101
L-CA
111
CRT1
117
DEV2
102
L-CA
121
CRT2
117

METHOD AND TERMINAL DEVICE FOR CRYPTOGRAPHICALLY SECURED TRANSMISSION OF DATA WITHIN A COMMUNICATION SYSTEM

CROSS-REFERENCE TO RELATED APPLICATIONS

This is a U.S. national stage of application No. PCT/EP2024/050687 filed 12 Jan. 2024. Priority is claimed on European Application No. 23154280.4 filed 31 Jan. 2023, the content of which is incorporated herein by reference in its entirety.

BACKGROUND OF THE INVENTION

1. Field of the Invention

The present invention relates to an industrial automation system, a terminal device and a method for cryptographically secured transmission of data within a communication system, in particular time-critical data within a communication system.

2. Description of the Related Art

Industrial automation systems usually comprise a multiplicity of automation devices networked together via an industrial communication network and are used to control or regulate installations, machines or devices within the scope of production or process automation. Time-critical constraints in industrial automation systems mean that predominantly real-time communication protocols, such as PROFINET, PROFIBUS, real-time ethernet or time-sensitive networking (TSN) are used for communication between automation devices. In particular, control services or control applications can be distributed in an automated manner to currently available servers or virtual machines of an industrial automation system depending on the workload.

EP 3 646 559 B1 discloses a method for checking datagrams transmitted in an industrial automation system containing a plurality of automation cells, where datagrams to be checked are transmitted out of the automation cells via a respective firewall interface to the firewall system for checking and are checked there in a rule-based manner. The firewall system is formed by at least one virtual machine provided in a data processing system comprising a plurality of computer units. For transmission of the datagrams to be checked, in each case a data link layer tunnel is established between the respective firewall interface and the firewall system. Both datagrams to be checked and at least successfully checked datagrams are transmitted within the respective data link layer tunnel.

EP 3 975 502 A1 describes a method for providing time-critical services via a flow control environment, where in each case at least one server component is provided for each service, where the server component is formed by a flow control component that can be loaded into the flow control environment and executed there. A configuration unit for at least one gateway component of a subnetwork comprising the flow control environment ascertains globally valid access information associated with addressing information of each of the server components that is valid within the subnetwork. Depending on an operating mode predetermined via the configuration unit, one or more gateway components connected in parallel or in series are used. At least one gateway component forwards service access requests to the server components in accordance with forwarding or filter rules that map the access information and the operating mode.

EP 4 283 925 A1 discloses secured transmission of time-critical data within a communication system comprising a plurality of local networks in which data is transmitted via switching, at least one network superimposed with respect to the local networks in which data is transmitted via routing, and a gateway system for connecting the communication system to at least one unsecured external network. Network layer communication via the superimposed network is only authorized between authenticated system components. Switches authenticate each of the terminal devices and assign them to a physical or logical local network in accordance with a respective terminal device identity. Security layer communication is implicitly assigned within the local networks based on an assignment of the respective terminal devices to the same local network. Communication at OSI layer 3-7 between terminal devices of different local networks or with terminal devices in the unsecured external network is authorized via zero trust proxies that are each assigned to a local network.

U.S. Pub. No. 2018/323977 A1 discloses a method comprising receiving a certificate request for a certification authority and a first digital certificate from a device. The certification request is digitally signed by the device and transmitted to a certification authority. In addition, the first digital certificate is stored in the device. The first digital certificate is checked by the certification authority via a second digital certificate of another certification authority. The digital signature of the certification request is checked using the first digital certificate. Finally, after verifying the first digital certificate and the digital signature, a second digital certificate is transmitted to the device.

Industrial automation devices or terminal devices that exchange time-critical data with communication partners to control machines or apparatuses must be particularly protected against manipulation and the interception of sensitive data. One protective measure is in particular the encryption of communication from or to the afore-mentioned devices. Encryption protocols, such as transport layer security (TLS) or secure socket layer (SSL) are usually used for this purpose; these provide a key pair and a certificate based on a public key of the key pair for each device.

In order to be able to ensure secure communication, all communication partners must be able to trust the certificates of the afore-mentioned devices. The use of self-signed certificates generated by the devices is fundamentally unsuitable, particularly due to possible "man in the middle" attacks and problematic proof of authenticity. The generation of key pairs external to the device and certificates by a certification authority (CA) of a public key infrastructure (PKI) is not entirely without problems, because a private key of such a key pair can potentially be read during transmission to the respective device. Furthermore, in particular TLS certificates must be regularly renewed for security reasons. Therefore, the key pairs and certificates generated by a certification authority must be regularly transferred to the devices. In industrial automation systems, this affects a large number of devices.

SUMMARY OF THE INVENTION

In view of the foregoing, it is therefore an object of the present invention to provide an apparatus and method for cryptographically secured transmission of data, in particular time-critical data, within a communication system that enables low-effort, efficient and yet secure provision of key material and certificates to terminal devices of the communication system.

This and other objects and advantages are achieved in accordance with the invention by a terminal device and method for cryptographically secured transmission of data, in particular time-critical data, within a communication system, where the communication system comprises at least one switch or router and a plurality of terminal devices that in particular exchange time-critical data for controlling machines or apparatuses. The terminal devices, in particular embedded systems, case comprise a local certification instance which, when the respective terminal device is commissioned, generates a first key pair for the terminal device and a request to create a certificate assigned to the first key pair and, during protected operation of the terminal device, transmits the request to a higher-level certification instance. The requests created by the local certification instances are preferably certificate signing requests (CSR), which in particular comprise a serial number of the respective terminal device.

The communication system can in particular comprise an industrial automation system. Advantageously, the higher-level certification instance and the local certification instances each comprise functions of a certification authority (CA). Furthermore, the local certification instances preferably each comprise functions of a registration authority (RA) assigned to the higher-level certification instance.

In accordance with the invention, the higher-level certification instance checks each request of the local certification instances of the terminal devices. If the check is successful, then the higher-level certification instance creates a certificate assigned to the respective first key pair and transmits this to the respective local certification instance. The certificates generated by the higher-level certification instance are preferably issuing certificates, TLS or SSL client certificates or TLS or SSL server certificates.

In accordance with the invention, the terminal devices each terminate protected operation after receiving the certificate generated by the higher-level certification instance. After the termination of protected operation, the local certification instances each generate at least a second key pair and a certificate for the second key pair for cryptographically secured exchange of data, in particular time-critical data, from or to the terminal devices. Herein, the certificate for the second key pair is signed via a private key comprising the first key pair. Preferably, each exchange of data, in particular time-critical data, from or to the terminal devices is cryptographically secured via the second key pair. The certificate for the second key pair can advantageously be easily verified by a communication partner of the respective terminal device during the exchange of data, in particular time-critical data, using a root certificate of the higher-level certification instance.

The method in accordance with the invention is more secure than previous methods, because the private key or information required for key generation are generated in the terminal devices themselves and hence do not leave the terminal devices. This means that private keys cannot be read during key transmission. In addition, in particular when using TLS certificates, their distribution, which was previously required on a regular basis, is no longer necessary, since the certificates for the second key pairs can be generated by the terminal devices themselves as required, based on the certificate generated once for the first key pair generated by the higher-level certification instance. In addition, the present invention makes it possible to implement easily scalable security solutions for industrial automation systems, because the implementation effort on the part of the higher-level certification instance is largely independent of the number of terminal devices that create their own certificates used for cryptographically secured communication.

In accordance with the invention, only communication between the respective local certification instance and the higher-level certification instance is possible during protected operation of the terminal devices. For example, in each case a predetermined default gateway configuration or predetermined firewall settings can be activated for the protected operation of the terminal devices. Alternatively or additionally, the terminal devices and the higher-level certification instance can each be connected to one another during protected operation of the terminal devices within an environment that is at least virtually isolated from other terminal devices.

In accordance with a further advantageous embodiment of the present invention, the requests of the local certification instances each comprise an identifier of the respective terminal device, in particular an IDevID certificate (initial device identifier), or a signature created by the respective local certification instance. Here, checking the requests by the higher-level certification instance each comprise checking the validity of the identifier of the respective terminal device or the signature created by the respective local certification instance. Hence, the certificate can be checked in an efficient and reliable manner.

When devices are manufactured in accordance with Institute of Electrical and Electronics Engineers (IEEE) standard 802.1 AR, IDeVID certificates are preferably each stored in the terminal devices together with a private key assigned to the respective IDeVID certificate. Herein, the IDevID certificates each comprise the serial number of the respective terminal device and are signed by a respective manufacturer. In contrast to the private key assigned in each case, the IDevID certificates can be read after a device has been manufactured. This allows the identity of a terminal device to be checked by reading the IDeVID certificate and checking its validity using a root certificate from the respective manufacturer. In particular, when checking the identity of a terminal device, a serial number comprising a certificate signing request is compared to see if it matches the serial number comprising the IDevID certificate. In addition, the terminal device proves access to the private key assigned to the IDeVID certificate by means of a challenge-response method or by signing a random number sent to the terminal device via the private key.

The terminal device in accordance with the invention for cryptographically secured transmission of data, in particular time-critical data, within a communication system, is particularly configured to perform a method in accordance with the disclosed embodiments. In accordance with the invention, the terminal device includes a processor and memory and is configured to exchange data, in particular time-critical data, within the communication system for controlling machines or apparatuses. In addition, the terminal device comprises a local certification instance, which is configured to generate a first key pair for the terminal device and a request to create a certificate assigned to the first key pair when the terminal device is commissioned and to transmit the request to a higher-level certification instance during protected operation of the terminal device.

Furthermore, the terminal device in accordance with the invention is configured, after reception of a certificate generated by the higher-level certification instance for the first key pair, to terminate protected operation. In addition, the local certification instance is configured, after the termination of protected operation, to generate at least a second key pair and a certificate for the second key pair for cryptographically secured exchange of data, in particular time-critical data, from or to the terminal device. Herein, this certificate is signed via a private key comprising the first key pair.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below with reference to an exemplary embodiment and with reference to the drawing, in which.

DETAILED DESCRIPTION OF THE EXEMPLARY EMBODIMENTS

Figure 1:
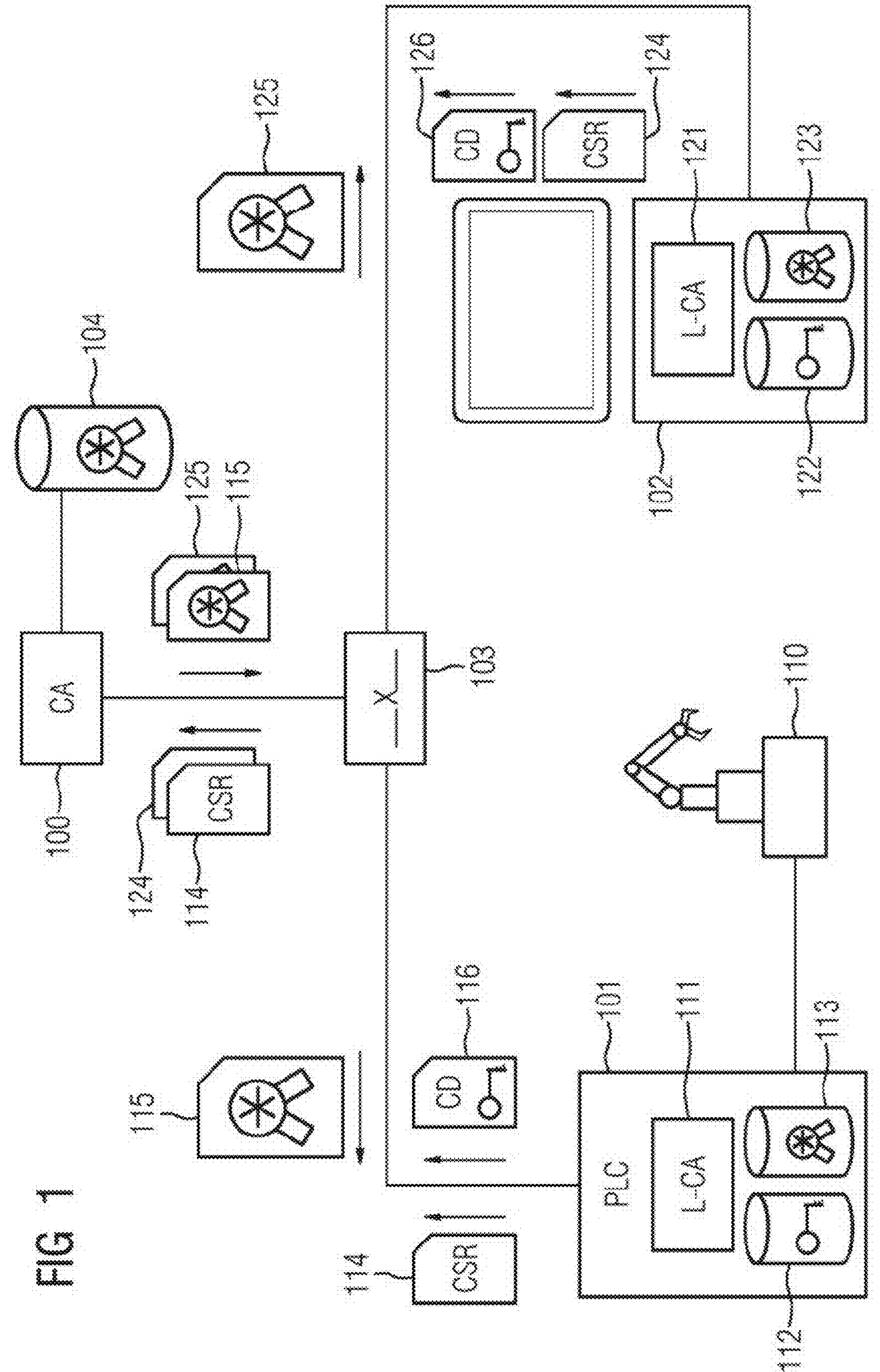
FIG. 1 is a schematic block diagram of an industrial automation system comprising a plurality of automation devices and a higher-level certification instance and in which data, in particular time-critical data, is transmitted in a cryptographically secured manner from or to the automation devices in accordance with the invention.

The industrial automation system represented in FIG. 1 has a higher-level certification instance 100, a plurality of automation devices 101-102 and a switch 103, which connects the higher-level certification instance 100 and the automation devices 101-102 to one another. The automation devices 101-102 exchange data, in particular time-critical data 116, 126, with one another for controlling machines or apparatuses 110.

The automation devices 101-102 can in particular be physical or virtual hosts that provide data or resources for other hosts. The data or resources can, for example, be assigned to services or control and monitoring applications of an industrial automation system, which are examples of time-critical services or applications.

In the present exemplary embodiment, the automation devices 101-102 implement functions of control devices of an industrial automation system, such as programmable logic controllers or machine controllers, or of field devices, such as sensors or actuators. Herein, the automation devices 101-102 are used to exchange control and measured variables with machines or apparatuses 110 controlled by control devices. In particular, the control devices are provided to ascertain suitable control variables from captured measured variables.

Alternatively or additionally, the automation devices 101-102 can each implement an operating and monitoring station and serve to implement process data or measurement and control variables that are processed or captured by control devices or other automation devices. In particular, an operating and monitoring station can be used to display values of a control loop and to change control parameters or programs.

For cryptographically secured transmission of time-critical data 116, 126 within the industrial automation system, the automation devices each comprise a local certification instance 111, 121 which, when the respective automation device is commissioned, generates a first key pair for the respective automation device 101-102 and a request 114, 124 to create a certificate assigned to the first key pair. The first key pair is preferably stored in a particularly secure key store 112, 122 of the respective automation device 101-102. A separate certificate store 113, 123 is, for example, provided in each case for certificates.

In the context of protected operation of the respective automation device 101-102, in particular during an onboarding-process, the request 114, 124 is transmitted to the higher-level certification instance 100. In the present exemplary embodiment, the higher-level certification instance 100 and the local certification instances 111, 121 each comprise functions of a certification authority (CA). Furthermore, the local certification instances 111, 121 each comprise functions of a registration authority (RA) assigned to the higher-level certification instance 100.

During protected operation of the automation devices 101-102 it can, for example, be provided that substantially only communication between the respective local certification instance 111, 121 and the higher-level certification instance 100 is possible. In addition, in each case a predetermined default gateway configuration or predetermined firewall settings can be activated for the protected operation of the automation devices 101-102. In particular, during protected operation of the automation devices 101-102, the automation devices 101-102 and the higher-level certification instance 100 can each be connected to one another within an environment that is at least virtually isolated from other automation devices or terminal devices.

The higher-level certification instance 100 in each case checks the requests 114, 124 of the local certification instances 111, 121 of the automation devices 101-102. If the check is successful, then the higher-level certification instance 100 creates a certificate 115, 125 assigned to the respective first key pair and transmits this to the respective local certification instance 111, 121. The requests 114, 124 by the local certification instances 111, 121 are preferably certificate signing requests (CSR) and comprise, for example, a serial number of the respective automation device 101-102.

Advantageously, the requests 114, 124 of the local certification instances 111, 121 each comprise a IDevID (initial device identifier) certificate as an identifier of the respective automation device 101-102. Alternatively or additionally, the requests 114, 124 can comprise a signature created by the respective local certification instance 111, 121. Accordingly, checking the requests 114, 124 by the higher-level certification instance 100, in each case comprises checking the validity of the identifier of the respective automation device 101-102 or the signature created by the respective local certification instance 111, 121.

When devices are manufactured in accordance with Institute of Electrical and Electronics Engineers (IEEE) standard 802.1 AR, the IDevID certificates are preferably each stored together with a private key assigned to the respective IDevID certificate in the certificate store 113, 123 or in the key store 112, 122 of the respective automation device 101-102. In particular, the IDevID certificates each comprise the serial number of the respective automation device 101-

102 and are signed by a respective manufacturer. In contrast to the private key assigned in each case, which is particularly secured in the key store 112, 122, the IDevID certificates can be read after the device has been manufactured. This allows the identity of an automation device 101-102 to be checked by reading the IDevID certificate and checking its validity using a root certificate from the respective manufacturer.

In the present exemplary embodiment, when checking the identity of an automation device 101-102, the higher-level certification instance 100 compares a serial number comprised by a certificate signing request to see if it matches the serial number comprised by the IDevID certificate. In addition, the automation device 101-102 proves access to the private key assigned to the IDevID certificate via a challenge-response method or by signing a random number sent by the higher-level certification instance 100 to the automation device 101-102 via the private key.

After reception of the certificate 115, 125 generated by the higher-level certification instance 100, the automation devices 101-102 each terminate protected operation. The certificates generated by the higher-level certification instance 100 are preferably issuing certificates. In principle, it is also possible for the higher-level certification instance 100 to create TLS or SSL client certificates or TLS or SSL server certificates.

After the termination of protected operation, the local certification instances 111, 121 each generate at least a second key pair and a certificate for the second key pair for cryptographically secured exchange of time-critical data 116, 126 from or to the automation devices 101-102. This certificate is signed via a private key comprising the first key pair and stored in the certificate store 113, 123.

The exchange of data, in particular time-critical data 116, 126 from or to the automation devices 101-102 is in each case cryptographically secured via the second key pair.

Figure 2:
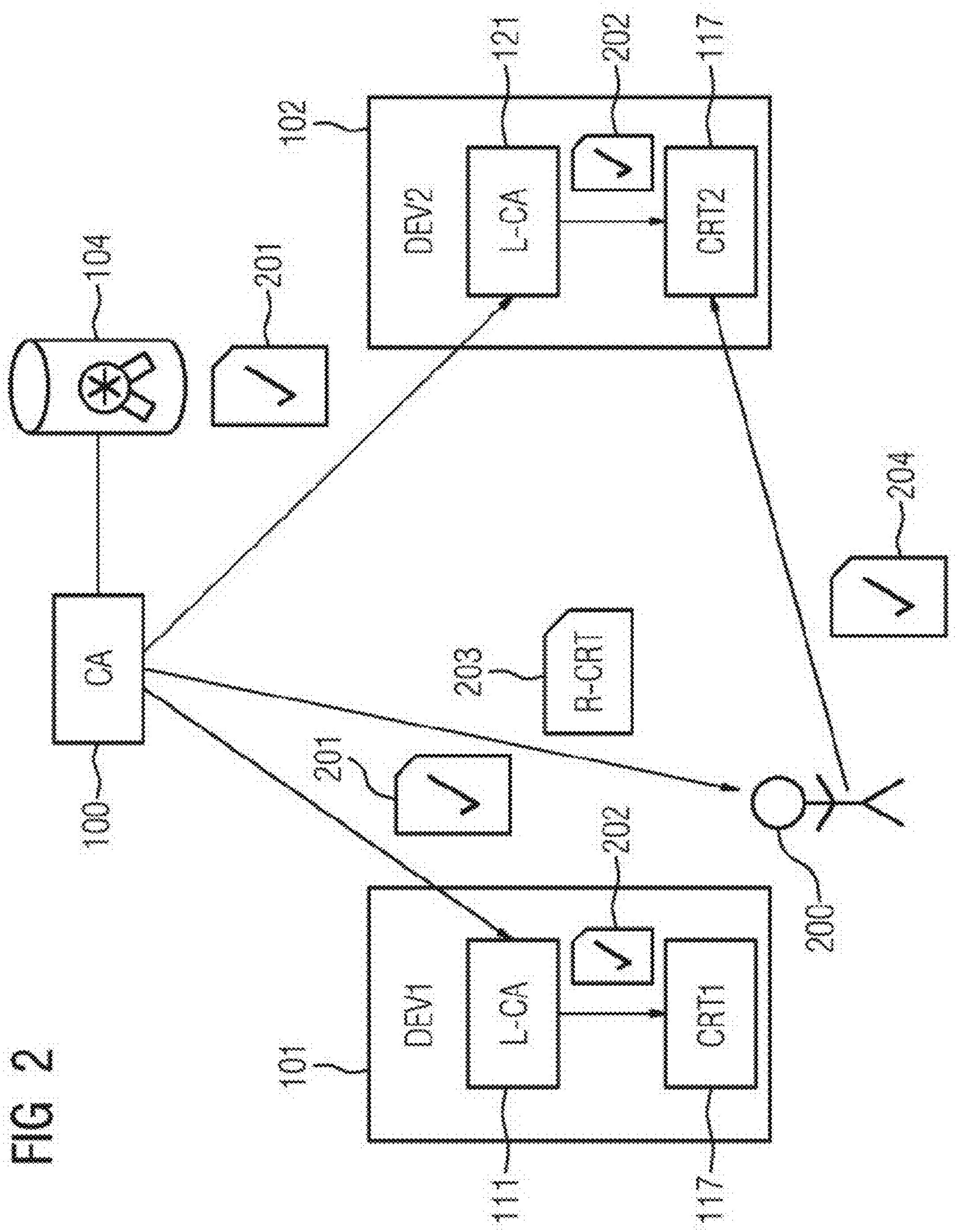
FIG. 2 is a representation of a procedure for verifying certificates provided for cryptographically secured data transmission in accordance with the invention.

In accordance with step 201 of the procedure shown in FIG. 2, the certificates for the first key pairs are used by the higher-level certification instance 100 to authenticate the local certification instances 111, 121. In accordance with step 202, the local certification instances 111, 121 in turn authenticate the certificates 117 for the self-generated second key pairs.

In accordance with step 203, a communication partner 200 of the automation devices 101-102 can retrieve a root certificate from a certificate store 104 of the higher-level certification instance 100. Finally, in accordance with step 204, the certificate for the second key pair, which is signed via the private key comprising the first key pair, is verified by the communication partner 200 using the root certificate of the higher-level certification instance 100.

In the present exemplary embodiment, the automation devices 101-102 each automatically generate a new second key pair and a certificate for the new second key pair if the certificate for the second key pair loses its validity due to a configuration change. For example, TLS certificates lose their validity after IP address changes if they were created for a selected IP address. Hence, cryptographically secured communication is ensured even after such configuration changes.

Figure 3:
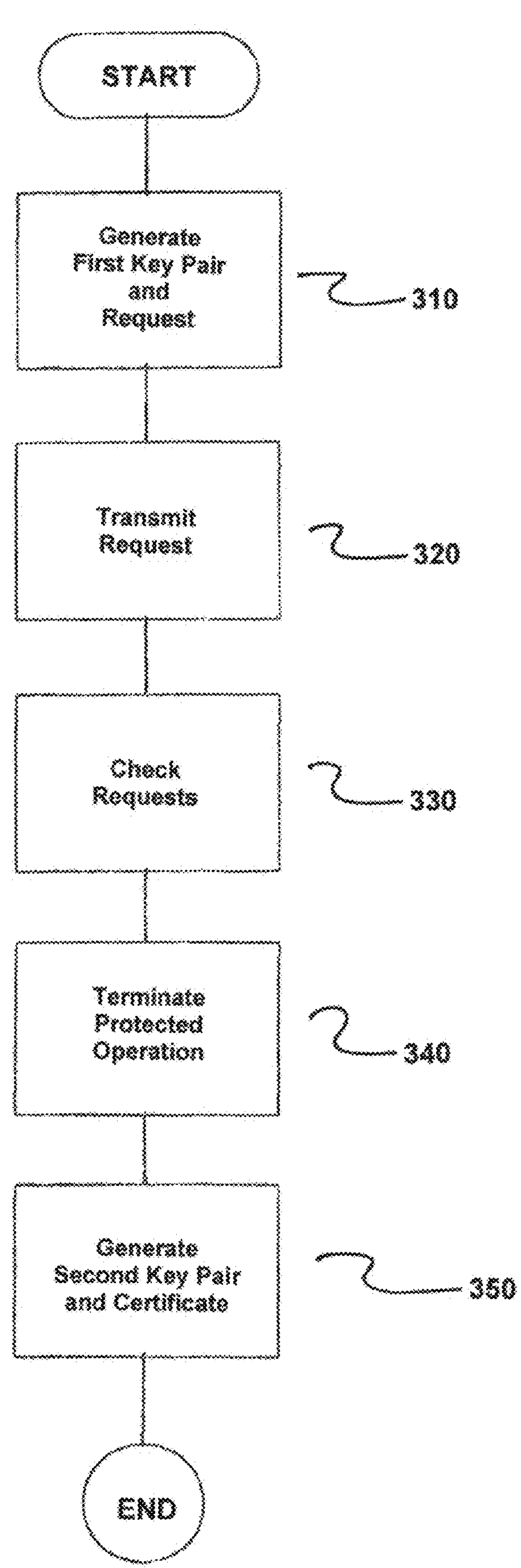
FIG. 3 is a flowchart of the method in accordance with the invention.

FIG. 3 is a flowchart of the method for cryptographically secured transmission of data within a communication system in which the communication system comprises at least one switch 103 or router and a plurality of terminal devices 101-102 which exchange data for controlling machines or apparatuses 110.

The method comprises generating, by the terminal devices 101-102 that each comprise a local certification instance 111, 121, a first key pair for the terminal device and a request 114, 124 when a respective terminal device is commissioned to create a certificate assigned to the first key pair, as indicated in step 310.

Next, the terminal devices 101-102 transmit the request to a higher-level certification instance 100 during protected operation of the respective terminal device, as indicated in step 320. In accordance with the inventive method, during the protected operation of the terminal devices 101-102, only communication between the respective local certification instance 111, 121 and the higher-level certification instance 100 is possible.

Next, the higher-level certification instance 100 checks requests 114, 124 of each of the local certification instances of the terminal devices and a certificate 115, 125 assigned to the respective first key pair is created and transmitted to the respective local certification instance 111, 121 if the check is successful, as indicated in step 330.

Next, the terminal devices 101-102 terminate each protected operation after receiving the certificate generated by the higher-level certification instance, as indicated in step 340.

Next, each of the local certification instances 111, 121 generate at least a second key pair and a certificate for the second key pair for cryptographically secured exchange of data 116, 126 from and to the terminal devices after termination of protected operation, as indicated in step 350. In accordance with the inventive method, the generated certificate is thus signed via a private key comprising the first key pair.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps that perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for cryptographically secured transmission of data within a communication system in which the communication system comprises at least one switch or router and a plurality of terminal devices which exchange data for controlling machines or apparatuses, the method comprising:

generating, by terminal devices which each comprise a local certification instance, a first key pair for the terminal device and a request when a respective terminal device is commissioned to create a certificate assigned to the first key pair;

transmitting, by the terminal devices, the request to a higher-level certification instance during protected operation of the respective terminal device, only communication between the respective local certification instance and the higher-level certification instance being possible during the protected operation of the terminal devices;

checking, by the higher-level certification instance, requests of each of the local certification instances of the terminal devices and creating a certificate assigned to the respective first key pair and transmitting the certificate to the respective local certification instance if the check is successful;

terminating, by the terminal devices, each protected operation after receiving the certificate generated by the higher-level certification instance; and generating, by each local certification instances, at least a second key pair and a certificate for the second key pair for cryptographically secured exchange of data from and to the terminal devices after termination of protected operation;

wherein the generated certificate is signed via a private key comprising the first key pair.

2. The method as claimed in claim 1, wherein at least one of a predetermined default gateway configuration and predetermined firewall settings are activated for each protected operation of the terminal devices.

3. The method as claimed in claim 2, wherein the terminal devices and the higher-level certification instance are each connected to one another during the protected operation of the terminal devices within an environment isolated from other terminal devices.

4. The method as claimed in claim 1, wherein the terminal devices and the higher-level certification instance are each connected to one another during the protected operation of the terminal devices within an environment isolated from other terminal devices.

5. The method as claimed in claim 1, wherein the requests of the local certification instances each comprise at least one of an identifier of the respective terminal device and a signature created by the respective local certification instance; and wherein each check of the requests by the higher-level certification instance comprises checking at least one of a validity of the identifier of the respective terminal device and the signature created by the respective local certification instance.

6. The method as claimed in claim 1, wherein each exchange of data from and/or to the terminal devices is cryptographically secured via the second key pair.

7. The method as claimed in claim 6, wherein the certificate for the second key pair signed via the private key comprised by the first key pair is verified by a communication partner of the respective terminal device during the exchange of data utilizing a root certificate of the higher-level certification instance.

8. The method as claimed in claim 1, wherein the requests created by the local certification instances are certificate signing requests; and wherein the certificates generated by the higher-level certification instance are at least one of (i) issuing certificates, (ii) transport layer security or secure socket layer client certificates and (iii) TLS or SSL server certificates.

9. The method as claimed in claim 1, wherein the higher-level certification instance and the local certification instances each comprise functions of a certification authority.

10. The method as claimed in claim 9, wherein the local certification instances each comprise functions of a registration authority assigned to the higher-level certification instance.

11. The method as claimed in claim 1, wherein the communication system comprises an industrial automation system.

12. The method as claimed in claim 1, wherein the terminal devices each automatically generate a new second key pair and a certificate for the new second key pair in an event of a loss of validity of the certificate for the second key pair caused by a configuration change.

13. A terminal device for cryptographically secured transmission of data within a communication system, comprising:

a processor; and memory;

wherein the terminal device is configured to exchange data within the communication system for controlling at least one of machines and apparatuses;

wherein the terminal device comprises a local certification instance, which is configured, when the terminal device is commissioned, to generate a first key pair for the terminal device and a request to create a certificate assigned to the first key pair and which, during protected operation of the terminal device, transmits the request to a higher-level certification instance, during protected operation communication being only possible between the local certification instance and the higher-level certification instance;

wherein the terminal device is further configured to, after reception of a certificate generated by the higher-level certification instance for the first key pair, terminate protected operation; and wherein the local certification instance is further configured to, after the termination of protected operation, generate at least a second key pair and a certificate for the second key pair for cryptographically secured exchange of data from and/or to the terminal device, the certificate being signed via a private key comprising the first key pair.

14. The terminal device as claimed in claim 13, wherein the terminal device is configured to:

generate a first key pair and a request when the terminal device is commissioned to create a certificate assigned to the first key pair;

transmit the request to a higher-level certification instance during protected operation of the respective terminal device, only communication between the respective local certification instance and the higher-level certification instance being possible during the protected operation of the terminal device, the higher-level certification instance checking requests of each of the local certification instances of the terminal device and creating a certificate assigned to the respective first key pair and transmitting the certificate to the respective local certification instance if the check is successful; and terminate each protected operation after receiving the certificate generated by the higher-level certification instance, and subsequent to termination of the protected operation, generate at least a second key pair and a certificate by each local certification instance for the second key pair for cryptographically secured exchange of data from and to the terminal devices;

wherein the generated certificate is signed via a private key comprising the first key pair.

* * * * *